United States Patent [19]

Klomp et al.

[11] Patent Number: 5,018,659

[45] Date of Patent: May 28, 1991

[54] METHOD OF BONDING A METAL OXIDE TO A METAL

[75] Inventors: Johannes T. Klomp, Geldrop; Adrianus J. C. Van De Ven; Johan F. J. M. Caers, both of Eindhoven, all of Netherlands

[73] Assignee: U.S. Philips Corp., New York, N.Y.

[21] Appl. No.: 360,648

[22] Filed: Jun. 2, 1989

[30] Foreign Application Priority Data

Jun. 6, 1988 [NL] Netherlands ............... 8801439

[51] Int. Cl.$^5$ ............... B23K 31/00; B23K 101/36; C04B 41/51; C23C 26/00
[52] U.S. Cl. ............................ 228/121; 228/124; 228/220
[58] Field of Search ............ 228/121, 122, 124, 220, 228/263.12

[56] References Cited

U.S. PATENT DOCUMENTS

| | | | |
|---|---|---|---|
| 3,132,044 | 5/1964 | Pearsall | 228/220 |
| 4,023,725 | 5/1977 | Ivett et al. | 228/124 |
| 4,285,894 | 8/1981 | Watanabe et al. | 264/65 |

FOREIGN PATENT DOCUMENTS

| | | | |
|---|---|---|---|
| 556614 | 4/1958 | Canada | 228/124 |
| 12139 | 7/1942 | Japan | 228/121 |
| 156581 | 9/1983 | Japan | 228/122 |
| 181770 | 10/1983 | Japan | 228/122 |

*Primary Examiner*—Sam Heinrich
*Attorney, Agent, or Firm*—William L. Botjer

[57] ABSTRACT

Inert non-magnetic metals are adhesively bonded to surfaces of metal oxides, for example ferrites, by means of a water vapor-hydrogen atmosphere. Reduction of the metal oxide only takes place at the interface of the inert metal and the metal oxide, after which the metal formed is partly dissolved in the inert metal.

5 Claims, No Drawings

METHOD OF BONDING A METAL OXIDE TO A METAL

BACKGROUND OF THE INVENTION

The invention relates to a method of bonding a surface of a metal oxide or a metal oxidic compound to a contact metal, the contact metal being brought into contact with the surface of the metal oxide or the metal oxidic compound.

A metal oxidic compound is to be understood to mean herein an oxidic compound of at least two metallic elements such as, for example, nickel ferrite $NiFe_2O_4$. Because of their magnetic properties ferrites are important ceramic compounds. Ferrites are used, inter alia, in magnetic heads for the purpose of magnetic recording. A thin non-magnetic metal layer is often applied between the two halves of the magnetic head, which metal layer serves as a so-called spacer.

Such a method is described in U.S. Pat. No. 3,793,705, in which titanium or chromium are applied to a ferrite by means of sputtering. Subsequently, the chromium layer is provided with a silver-containing brazing alloy. A non-magnetic metal is brought into contact herewith and the assembly is subsequently fired in an inert atmosphere, the bond between metal and ferrite being formed via the intermediate layer of chromium and the brazing alloy.

A disadvantage of the known method is that metals such as titanium and chromium react With the oxygen present in the sputtering gas or residual gas instead of with the oxygen of the metal oxidic compound, as a result of which the bonding of these metals to the metal oxide is insufficient. Moreover, a brazing alloy is required for the bonding to a second non-magnetic metal. The brazing alloy may interact undesirably with the bonding layer and/or the metal layer.

SUMMARY OF THE INVENTION

It is an object of the invention to provide a method of the type mentioned in the opening paragraph which overcomes the above disadvantages.

According to the invention this object is achieved by a method as described in the opening paragraph, which is further characterized in that the metallic element of the metal oxide or at least one metallic element of the metal oxidic compound is subsequently reduced at the surface to the corresponding metal by means of a reducing gas mixture, said metal and the contact metal mixing and the contact metal being inert relative to oxygen under the process conditions.

The bonding of an inert metal Me to $NiFe_2O_4$ (nickel ferrite) is used as an example. The metal Me has been previously provided onto the surface of the ferrite, for example, by means of sputtering or vacuum evaporation.

The reducing gas mixture contains gas in the reduced form $G_{red}$ and gas in the oxidised form $G_{ox}$.

The reaction taking place can be represented as follows:

$$NiFe_2O_4 + G_{red} + Me \rightarrow Fe_2O_3 + G_{ox} + [Ni]_{Me} \qquad (I).$$

In this equation $[Ni]_{Me}$ is a solid solution of Ni in the inert contact metal Me.

In this case only NiO (least stable oxide) of $NiFe_2O_4$ is reduced to Ni:

$$NiO \rightarrow Ni + \tfrac{1}{2}O_2 - Q_{red}$$

In this equation $Q_{red}$ is the required reduction energy. This reaction is brought about by the oxidation heat $Q_{ox}$ from $G_{red}$ to $G_{ox}$ and the heat of solution $Q_L$ of Ni in the metal Me:

$$G_{red} + \tfrac{1}{2}O_2 \rightarrow G_{ox} + Q_{ox}$$

$$Ni + Me \rightarrow [Ni]_{Me} + Q_L.$$

The reducing power (reduction potential) of the reducing gas mixture is determined by the ratio $p(G_{red}) : p(G_{ox})$. Herein p is the partial pressure of the gas G. In combination with the heat of solution $Q_L$ the reduction potential is to be adjusted so that reduction of the metal oxide only takes place at the interface Me-metal oxide. Too strong a reducing power of the gas mixture would lead to reduction o: the entire oxide, causing the loss of important properties such as magnetic properties. $Q_{red}$, $Q_{ox}$, $Q_L$ and solubilities of metals can be found in reference books. By calculating the free energy $\Delta G$ of the reaction (I) the ratio $p(G_{ox}) : p(G_{red})$ can be determined.

An embodiment of the method according to the invention is characterized in that the reducing gas mixture comprises hydrogen and water vapor. In the foregoing $G_{red}$ denotes hydrogen and $G_{ox}$ denotes water vapor. Other reducing gas mixtures such as CO and $CO_2$ may alternatively be used.

A suitable embodiment of the method according to the invention is characterized in that reduction takes place at a temperature between 800° and 1100° K. and the partial pressure ratio between hydrogen and water vapor is smaller than $10^{-2}$. Under these conditions a properly adhering bond between the inert metal and the oxidic surface is obtained in 5 minutes, the reduction of the metal oxide taking place only at the surface.

An embodiment of the method according to the invention is characterized in that the contact metal is selected from the group formed by platinum, iridium and rhenium Under the process conditions these metals are inert relative to oxygen and, moreover, they are non-magnetic so that they can suitably be used as a spacer layer in magnetic heads. Other non-magnetic metals such as Mo and W may alternatively be used.

A suitable embodiment of the method according to the invention is characterized in that the contact metal is provided by means of sputtering or vacuum evaporation Unlike chromium and titanium, the use of the above inert metals does not lead to oxidation of the metal by the sputtering gas or residual gas.

A very suitable embodiment of the method according to the invention is characterized in that the metal oxidic compound is a ferrite. Ferrites are ferromagnetic metal oxides of the general formula $MFe_2O_4$. In this formula, M is a bivalent metal. The metal M may be partly replaced by another bivalent metal.

An embodiment of the method according to the invention is characterized in that the ferrite is nickel ferrite, nickel zinc ferrite or manganese zinc ferrite. The formula of nickel zinc ferrite is $Ni_xZn_{1/x}Fe_2O_4$ and the formula of manganese zinc ferrite is $Mn_xZn_{1-x}Fe_2O_4$. In this formula x is the molar fraction of Ni and Mn, respectively, in the ferrite.

DETAILED DESCRIPTION OF THE DRAWINGS

The invention will be explained by means of the following exemplary embodiments:

EXAMPLES

Blocks of polycrystalline nickel-zinc ferrite $Ni_{0.1}Zn_{0.9}Fe_2O_4$ having the dimensions $10 \times 6 \times 2.5$ mm are polished on one side (face $10 \times 6$ mm). These polished faces are cleaned by means of an $Ar^+$ ion bombardment having an energy of 50 eV and a current density of 10 mA/cm$^2$. Subsequently a platinum layer having a thickness from 200–300 nm is provided on these faces by means of sputtering. The gas mixture in which the samples are heated, is prepared from boiling water at atmospheric pressure to which a mixture consisting of nitrogen and 7% of hydrogen is added. The gas mixture obtained is led to a bell-jar via a pipe whose wall temperature is kept above 100° C. The samples are contained in a metal box in the bell-jar and are heated by means of a RF field at an overall pressure of 1 bar. The samples are heated at temperatures of 800° or 1100° K. for 5 minutes. The ratio $P_{H_2}:P_{H_2O}$ is adjusted to $10^{-1}$, $10^{-2}$ and $10^{-3.3}$, respectively. By means of AES and SIMS analyses concentration profiles of the metallic elements are measured in a direction perpendicular to the interface platinum-ferrite.

To measure the strength of the bond between platinum and ferrite after the reduction treatment, the blocks are provided on the platinum side with two parallel gold wires having a diameter of 200 μm. An identical block is placed on these gold wires in such a manner that the platinum side faces the gold wires. This assembly is pressed together using a force of 300N and heated in air for 10 minutes at 500° C. The bonding surface area is 4.8 mm$^2$. The tensile break is measured by means of a tensile strength tester. The results are listed in the following table.

| Sample | Temperature (K.) | $\frac{P_{H_2}}{P_{H_2O}}$ | Result | Tensile break (N) |
| --- | --- | --- | --- | --- |
| 1 | 1100 | $10^{-1}$ | reduction bulk $[Zn,Ni,Fe]_{Pt}$ | 110 |
| 2 | 800 | $10^{-1}$ | reduction bulk $[Zn,Ni,Fe]_{Pt}$ | 175 |

-continued

| Sample | Temperature (K.) | $\frac{P_{H_2}}{P_{H_2O}}$ | Result | Tensile break (N) |
| --- | --- | --- | --- | --- |
| 3 | 800 | $10^{-2}$ | $[Zn]_{Pt}$ | 238 |
| 4 | 800 | $10^{-3.3}$ | $[Zn]_{Pt}$ | 205 |

The table shows that the reducing power of the gas mixture used for the samples 1 and 2 is too large. Under these conditions reduction of the bulk of the ferrite takes place The three oxides of zinc, nickel and iron are reduced to the corresponding metals which subsequently dissolve in platinum. In the case of the preparations 3 and 4 only reduction of zinc oxide to zinc takes place, the zinc formed dissolving in platinum.

After the reduction treatment the platinum layer of a sample treated in accordance with Nos. 3 and 4 is polished as far as the original platinum-ferrite interface. By measuring the so-called Kerr-effect it is established that the reduction treatment has not changed the magnetooptical properties of the ferrite. In this measuring operation, polarised monochromatic light is reflected from the surface to be measured and the rotation of the plane of polarisation is determined In the case of preparations treated in accordance with Nos. 1 and 2, however, the Kerr-effect can be measured clearly On determining the tensile break it has been found that in all cases the ferrite is subject to breakage.

We claim:

1. A method of bonding a surface of a metal oxide or a metal oxidic compound to a contact metal, the contact metal being brought into contact with the surface of the metal oxide or the metal oxidic compound, characterized in that the metallic element of the metal oxide or at least one metallic element of the metal oxidic compound is subsequently reduced at the surface to the corresponding metal by means of a reducing gas mixture including hydrogen and water vapor at a temperature between 800° and 1100° K. and the partial pressure ratio between hydrogen and water vapor is smaller than $10^{-2}$, said metallic element and the contact metal mixing, and the contact metal being inert relative to oxygen under the process conditions.

2. A method as claimed in claim 1, characterized in that the contact metal is selected from the group formed by platinum, iridium and rhenium.

3. A method as claimed in claim 1, characterized in that the contact metal is provided by means of sputtering or vacuum evaporation.

4. A method as claimed in claim 1, characterized in that the metal oxidic compound is a ferrite.

5. A method as claimed in claim 4, characterized in that the ferrite is nickel ferrite, nickel ferrite or manganese zinc ferrite.

* * * * *